United States Patent
Lee et al.

(10) Patent No.: US 11,436,168 B2
(45) Date of Patent: Sep. 6, 2022

(54) ACCELERATOR AND ELECTRONIC DEVICE INCLUDING THE SAME

(71) Applicants: SAMSUNG ELECTRONICS CO., LTD., Suwon-si (KR); SNU R&DB FOUNDATION, Seoul (KR)

(72) Inventors: Seung Wook Lee, Suwon-si (KR); Hweesoo Kim, Seoul (KR); Jung Ho Ahn, Seoul (KR)

(73) Assignees: Samsung Electronics Co., Ltd., Suwon-si (KR); SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 17/192,032

(22) Filed: Mar. 4, 2021

(65) Prior Publication Data
US 2022/0114116 A1  Apr. 14, 2022

(30) Foreign Application Priority Data
Oct. 14, 2020  (KR) .................. 10-2020-0132834

(51) Int. Cl.
*G06F 13/16* (2006.01)
*G06F 15/80* (2006.01)

(52) U.S. Cl.
CPC ...... *G06F 13/1668* (2013.01); *G06F 15/8038* (2013.01)

(58) Field of Classification Search
None
See application file for complete search history.

(56) References Cited

U.S. PATENT DOCUMENTS

| | | | |
|---|---|---|---|
| 9,747,548 B2* | 8/2017 | Ross | G06F 17/153 |
| 10,241,837 B2* | 3/2019 | Huang | G06F 9/5044 |
| 10,521,390 B2 | 12/2019 | Linderman et al. | |
| 10,606,750 B1* | 3/2020 | Mattina | G06F 12/122 |
| 11,106,972 B1* | 8/2021 | Verheyen | G06N 3/063 |
| 2010/0138376 A1* | 6/2010 | Avis | G06F 16/90344 706/50 |
| 2018/0005061 A1* | 1/2018 | Chang | G06T 11/40 |
| 2018/0314671 A1* | 11/2018 | Zhang | G06N 3/063 |
| 2019/0164037 A1 | 5/2019 | Kim et al. | |

FOREIGN PATENT DOCUMENTS

| | | |
|---|---|---|
| CN | 109146072 A | 1/2019 |
| CN | 110390384 A | 10/2019 |
| CN | 106875011 B | 4/2020 |
| KR | 10-2019-0063393 A | 6/2019 |

* cited by examiner

*Primary Examiner* — Michael Sun
(74) *Attorney, Agent, or Firm* — NSIP Law

(57) ABSTRACT

An accelerator includes: a memory configured to store input data; a plurality of shift buffers each configured to shift input data received sequentially from the memory in each cycle, and in response to input data being stored in each of internal elements of the shift buffer, output the stored input data to a processing element (PE) array; a plurality of backup buffers each configured to store input data received sequentially from the memory and transfer the stored input data to one of the shift buffers; and the PE array configured to perform an operation on input data received from one or more of the shift buffers and on a corresponding kernel.

21 Claims, 11 Drawing Sheets

FIG. 4

ACCELERATOR AND ELECTRONIC DEVICE INCLUDING THE SAME

CROSS-REFERENCE TO RELATED APPLICATIONS

This application claims the benefit under 35 USC § 119(a) of Korean Patent Application No. 10-2020-0132834 filed on Oct. 14, 2020, in the Korean Intellectual Property Office, the entire disclosure of which is incorporated herein by reference for all purposes.

BACKGROUND

1. Field

The following description relates to an accelerator and an electronic device including the same.

2. Description of Related Art

As artificial intelligence (AI) technology develops, a need for independent hardware solely for AI is increasing. AI may perform inference and learning through an operation. Thus, there is a desire to develop hardware dedicated to the implementation of AI.

Such dedicated hardware for AI may be embodied by, for example, a central processing unit (CPU) and a graphics processing unit (GPU), or by a field-programmable gate array (FPGA) and an application-specific integrated circuit (ASIC) that may be repurposed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an accelerator includes: a memory configured to store input data; a plurality of shift buffers each configured to shift input data received sequentially from the memory in each cycle, and in response to input data being stored in each of internal elements of the shift buffer, output the stored input data to a processing element (PE) array; a plurality of backup buffers each configured to store input data received sequentially from the memory and transfer the stored input data to one of the shift buffers; and the PE array configured to perform an operation on input data received from one or more of the shift buffers and on a corresponding kernel.

A size of each of the shift buffers may correspond to a size of the corresponding kernel.

Data included in a first row of the input data may be stored sequentially in a first shift buffer among the shift buffers, and data included in a second row of the input data may be stored sequentially in a second shift buffer among the shift buffers and in a first backup buffer among the backup buffers.

In response to a row change occurring as all data included in a first row of the input data is output to the PE array through a first shift buffer among the shift buffers, data stored in a first backup buffer among the backup buffers may be transferred to the first shift buffer.

In response to the row change occurring in the first shift buffer, all data stored in the first shift buffer may be deleted, and data corresponding to a size of the first shift buffer may be transferred from the first backup buffer to the first shift buffer.

The data transferred from the first backup buffer to the first shift buffer may be deleted from the first backup buffer.

After the row change occurs, the data stored in the first backup buffer may be transferred sequentially to the first shift buffer, and the transferred data may be deleted from the first backup buffer.

In a cycle, all data included in a first row of the input data may be transferred to the PE array through a first shift buffer among the shift buffers, not all data included in a second row of the input data may be transferred to the PE array through a second shift buffer among the shift buffers, and data included in a third row of the input data may be stored sequentially in a second backup buffer among the backup buffers.

An entire size of the shift buffers may be determined based on a width and a height of the kernel.

An entire size of the backup buffers may be determined based on a width of the input data and a width and a height of the kernel.

Each of the shift buffers may be configured to perform a shift operation by a number corresponding to a stride applied to the kernel in each cycle.

Data transferred from a second backup buffer, which is lower than a first backup buffer among the backup buffers, to one of the shift buffers may also be transferred to the first backup buffer.

The PE array may include: a plurality of multi-port adders corresponding to a size of the kernel and configured to accumulate results of an operation corresponding to a row unit of the kernel.

The multi-port adders may include: a first adder having a port of a same size as a width of the kernel; and one or more second adders having a port of a size increased by 1 from the width of the kernel.

The PE array may include: a plurality of PEs in a systolic array structure that performs a convolution operation between the input data and the kernel.

The PE array may be configured to: pre-load weights included in the kernel into PEs of the PE array and perform a convolution operation on input data sequentially transferred from one or more of the shift buffers and on corresponding weights.

A pattern of accessing the memory may have a same form as an order defined in a row streaming of the input data.

An electronic device may include: the accelerator, wherein the accelerator may be configured to perform operations based on a model in response to an instruction set being executed; and a host processor configured to generate the instruction set.

In another general aspect, an electronic device includes: a host processor; and an accelerator comprising: a memory configured to store input data; a plurality of shift buffers each configured to shift input data received sequentially from the memory in each cycle, and in response to input data being stored in each of internal elements of the shift buffer, output the stored input data to a processing element (PE) array; a plurality of backup buffers each configured to store input data received sequentially from the memory and transfer the stored input data to one of the shift buffers; and the PE array configured to perform an operation on input data received from one or more of the shift buffers and on a corresponding kernel.

The input data stored in the memory may be inference target data, and a result of the operation on the input data may correspond to an inference result including any one of object recognition, pattern recognition, computer vision, speech recognition, machine translation, and machine interpretation.

The host processor may be configured to generate an instruction set executable by the accelerator in response to a request for execution of a model in the accelerator, and the accelerator may be configured to perform operations based on the model in response to the instruction set being executed.

In another general aspect, an accelerator includes: a memory configured to store input data; shift buffers including a shift buffer configured to upshift and output elements of a row of the input data sequentially received from the memory; backup buffers including a backup buffer configured to transfer elements of a subsequent row of the input data to the shift buffer, in response to a last element of the row being output from the shift buffer; a processing element (PE) array configured to perform operations on the data output from the shift buffers.

The shift buffers may include another shift buffer configured to upshift and output the elements of the subsequent row sequentially received from the memory.

Other features and aspects will be apparent from the following detailed description, the drawings, and the claims.

BRIEF DESCRIPTION OF THE DRAWINGS

FIG. 4 illustrates an example of an input data flow in row streaming.

Figure 1:
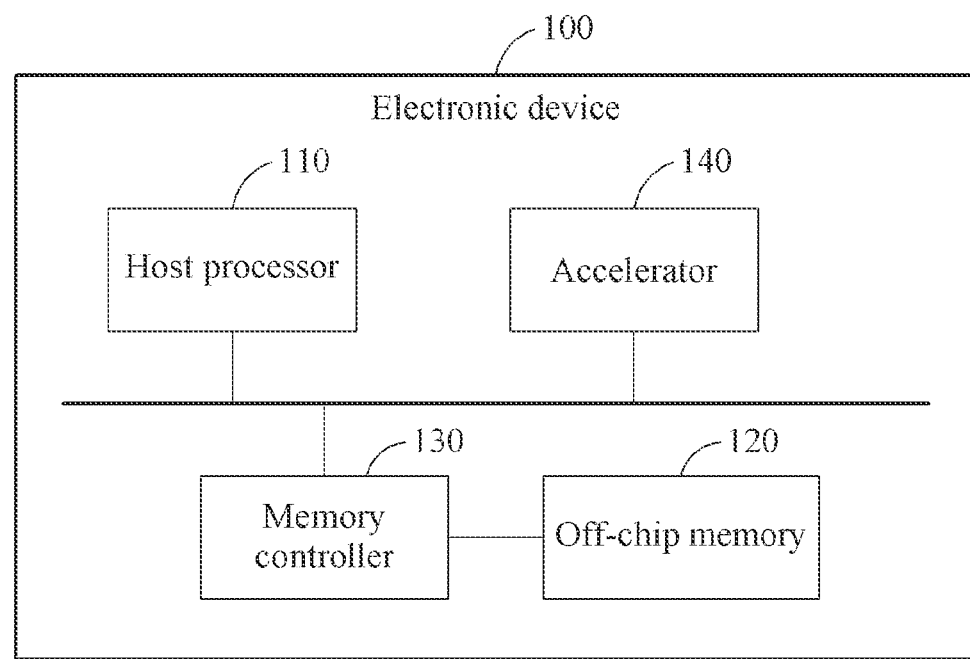
FIG. 1 illustrates an example of an electronic device.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. The terms "comprises," "includes," and "has" specify the presence of stated features, numbers, operations, members, elements, and/or combinations thereof, but do not preclude the presence or addition of one or more other features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

FIG. 1 illustrates an example of an electronic device.

Referring to FIG. 1, an electronic device 100 may include a host processor 110 (one or more processors, for example), an off-chip memory 120 (one or more memories, for example), a memory controller 130, and an accelerator 140. The host processor 110, the off-chip memory 120, the memory controller 130, and the accelerator 140 may communicate with one another through a bus, a network on a chip (NoC), a peripheral component interconnect express (PCIe), and the like.

The host processor 110 may be a device configured to control respective operations of the components included in the electronic device 100 and may include a central processing unit (CPU), for example. The host processor 110 may receive a request for processing a neural network in the accelerator 140 and generate an instruction executable in the accelerator 140 in response to the received request. The request may be made for a neural network-based data inference, and for obtaining a result of the data inference by the accelerator 140 executing the neural network for object recognition, pattern recognition, computer vision, speech recognition, machine translation, machine interpretation, and/or the like. The host processor 110 may transfer, to the accelerator 140, inference target data and parameters of the neural network. The accelerator 140 may generate a result of the data inference (for example, including any one or any combination of the object recognition, pattern recognition, computer vision, speech recognition, machine translation, machine interpretation, and/or the like) as a result of an operation between the target data and the parameters of the neural network.

The off-chip memory 120 may be a memory disposed outside the accelerator 140 (for example, a dynamic random-access memory (DRAM) used as a main memory of the electronic device 100). The off-chip memory 120 may store the inference target data and/or the parameters of the neural network to be executed in the accelerator 140, and data stored in the off-chip memory 120 may be transferred to the accelerator 140 for an inference. In addition, the off-chip memory 120 may be used in a case in which an on-chip memory inside the accelerator 140 is not sufficient to execute the neural network in the accelerator 140.

The off-chip memory 120 may have a greater memory capacity than the on-chip memory in the accelerator 140. However, when executing the neural network, a cost for access by the accelerator 140 to the off-chip memory 120 may be greater than a cost for access to the on-chip memory. Such a memory access cost may indicate an amount of power and/or time that is used for accessing a memory and then reading or writing data from or in the memory.

The accelerator 140 may be an artificial intelligence (AI) accelerator configured to execute the neural network according to an instruction of the host processor 110 and infer data to be input, and may be a separate processor distinguished from the host processor 110. The accelerator 140 may be a neural processor or a neural processing unit (NPU), a graphics processing unit (GPU), a tensor processing unit (TPU), a digital signal processor (DSP), and/or the like.

The accelerator 140 may be a separate dedicated processor that processes a workload more effectively than by the host processor 110 used for general purposes, based on the characteristics of operations (e.g., convolution operation) of the neural network. Here, one or more processing elements (PEs) included in the accelerator 140, and the on-chip memory may be used to process the workload. The on-chip memory may be a device including a global shared buffer and a local buffer that are included in the accelerator 140 and may be distinguished from the off-chip memory 120 disposed outside the accelerator 140. The on-chip memory may include, for example, a scratchpad memory accessible through an address space, a static random-access memory (SRAM), and/or the like.

The neural network may include a plurality of layers. In an example, the neural network may include an input layer, a plurality of hidden layers, and an output layer. Each of the layers may include a plurality of nodes. Each of the nodes may indicate a computation component having at least one input and output, and the nodes may be connected to one another. A weight may be set for a connection between nodes and be adjusted or changed. The weight may increase, decrease, or maintain a related data value, thereby determining an influence of the data value on a final result. To each node included in the output layer, weighted inputs of nodes included in a previous layer may be input. A process in which weighted data is input from a layer to a subsequent layer of the layer may be referred to as propagation.

In an example, the accelerator 140 may include a PE array having a systolic array structure to perform a convolution operation included in the neural network. When a typical electronic device frequently performs memory access to use the same target data for several operations based on the characteristics of the convolution operation, a performance of an accelerator of the typical electronic device is affected. Thus, the electronic device 100 and method of one or more embodiments improves the energy efficiency of the accelerator 140 by removing data duplication occurring in a global SRAM or repetitive memory access for the same input data. The method will be described hereinafter.

The electronic device 100 may be embodied as a user terminal that obtains inference target data under the control of a user, or a server that receives the inference target data from one or more user terminals, performs an inference, and then returns a result of the inference. The user terminal may include, for example, a computing device such as a smartphone, a personal computer (PC), a tablet PC, and a laptop, a wearable device such as a smart watch and smart eyeglasses, a home appliance such as a smart speaker, a smart television (TV), and/or a smart refrigerator, and/or other devices such as a smart vehicle, a smart kiosk, an Internet of things (IoT) device, a drone, and/or a robot.

Figure 2:
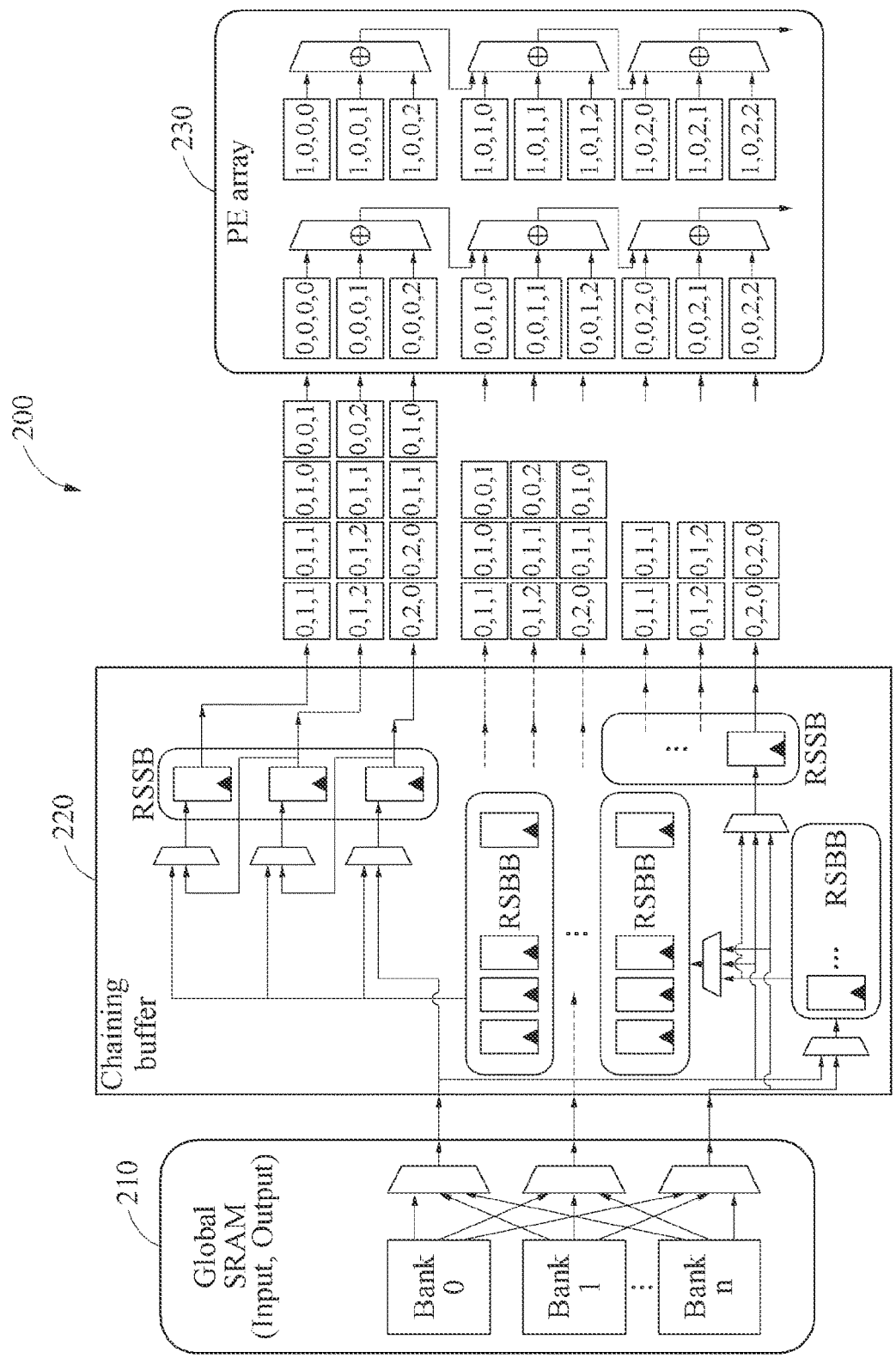
FIG. 2 illustrates an example of an accelerator.

FIG. 2 illustrates an example of an accelerator.

Referring to FIG. 2, an accelerator 200 may include a global SRAM 210, a chaining buffer 220, and a PE array 230. In a non-limiting example, the accelerator 140 may be or include the accelerator 200.

The accelerator 200 may restructure input data to be a form to be processed by the PE array 230 by internally shifting or backing up the input data which is row-unit input data transferred through the global SRAM 210 using the chaining buffer 220. To this end, the accelerator 200 may include the chaining buffer 220 that receives row-unit input data and then transfers the input data in a form of a duplicated input data pattern to the PE array 230. The chaining buffer 220 may include a plurality of row streaming shift buffers (RSSBs) and a plurality of row streaming backup buffers (RSBBs). In addition, the accelerator 200 may include the PE array 230 including multi-port adders having a number of ports corresponding to a kernel width or a value of the kernel width+1, in order to perform an accumulation operation once by each kernel row unit. Thus, for a convolution operation performed in the PE array 230 of a systolic array structure, memory access to the global SRAM 210 may be minimized and the performance of the accelerator 200 may be improved accordingly. A detailed description will follow hereinafter.

The global SRAM 210 may be a buffer that stores input data which is a target for an operation and output data which is a result of the operation performed in the PE array 230. The global SRAM 210 may correspond to an on-chip memory described above with reference to FIG. 1. The global SRAM 210 may include a plurality of banks and a plurality of multiplexers (MUXs). Each of the banks may be an element that stores actual data. Data stored in a bank may be transferred to one of buffers included in the chaining buffer 220 through a MUX.

Weights included in a kernel to be applied to an operation may be loaded into a corresponding buffer of the chaining buffer 220 after being stored in the global SRAM 210 according to the systolic array structure, or may be immediately loaded from a DRAM through first in, first out (FIFO). In general, a re-utilization rate of a weight may be extremely high in a convolution operation, and thus the operation may be performed in a weight stationary form. In such a case, the convolution operation may be performed in the systolic array structure through a method by which, after a weight is pre-loaded into the PE array 230 and the weight is mapped in the PE array 230, input data to be computed along with the weight is continuously fed to a leftmost column of the PE array 230. Here, inside a systolic array, input data may be shifted from left to right in each cycle, and a partial sum generated after an operation performed along with a weight may be continuously accumulated while moving to each cycle from top to bottom.

As described above, the chaining buffer 220 may include the RSSBs and the RSBBs. In the example of FIG. 2, in the chaining buffer 220, the RSSBs are illustrated in a vertically long shape and the RSBBs are illustrated in a horizontally long shape.

Regarding an operation of each buffer, an RSSB may store data as much as a maximum kernel width while shifting input data transferred from the global SRAM 210 in each cycle. Through this, input data loaded through one-time memory access may be reused by a kernel width through a corresponding buffer. In a case in which input data transferred from the global SRAM 210 is to be computed with another kernel row in addition to a current kernel row, an RSBB may transfer the input data to an RSSB corresponding to the kernel row when the input data is to be used for the other kernel row while backing up the input data therein. Through this, the accelerator 200 of one or more embodiments may remove repetitive memory access to the global SRAM 210, and enable the re-utilization as much as a kernel height through an internal buffer. That is, as the chaining buffer 220 restructures input data transferred from the global SRAM 210 and transfers the restructured data to the PE array 230, the memory access to the global SRAM 210 may be minimized. In the example of FIG. 2, input data restructured by the chaining buffer 220 and then transferred to the PE array 230 is indicated between the chaining buffer 220 and the PE array 230. The input data is represented in a form of [input channel (IC), input height (IH), input width (IW)].

In the systolic array structure, kernel row-unit operations to be performed in the PE array 230 may be performed simultaneously. Thus, for example, in a case of a 3×3 kernel represented in a form of [output channel (OC), IC, kernel height (KH), kernel width (KW)], a 3-input adder may be used for a first kernel row [(0, 0, 0, 0) (0, 0, 0, 1), (0, 0, 0, 2)] of the PE array 230 and a 4-input adder may be used for a second kernel row [(0, 0, 1, 0) (0, 0, 1, 1), (0, 0, 1, 2)] and a third kernel row [(0, 0, 2, 0) (0, 0, 2, 1), (0, 0, 2, 2)] of the PE array 230. Through such multi-port adders, partial sums computed in different rows may all be accumulated.

A systolic array structure in a form of [N×M] may be a structure that feeds only N sets of input data to N×M PEs in each cycle. Through this, a high operation performance corresponding to N×M may be obtained by a memory bandwidth corresponding to N which is relatively less than the number of the PEs. To this end, it may operate in a manner that input data or a weight, and a partial sum move internally in a row direction or a column direction for each cycle. In addition, in a weight stationary case, it may operate in a manner that a weight is pre-loaded and input data to be computed with the weight is continuously applied to a leftmost column of the PE array 230 in each cycle while the weight is fixed in the PE array 230, and input data of a different channel is fed for each row. It may operate in a manner that input data moves from left to right in the systolic array for each cycle and the input data is reused while being computed with a kernel of another output channel stored in another column.

In the example of FIG. 2, each of the PEs included in the PE array 230 is illustrated in a shape of a rectangle, inside of which a weight pre-loaded into a corresponding PE is indicated. A 9×2 systolic array structure is illustrated in FIG. 2, in which input data computed with a weight (0, 0, 0, 0) in a current cycle may be shifted to right in a next cycle to be computed with a weight (1, 0, 0, 0).

The accelerator 200 of one or more embodiments may effectively perform a convolution operation, which is an important operation in the systolic array structure, and may be applied to a mobile and/or embedded system that is sensitive to power consumption. In addition to such a mobile environment, the accelerator 200 may also be applied to a system that needs to access an external memory greatly due to an insufficient on-chip memory and requires low power.

Figure 3:
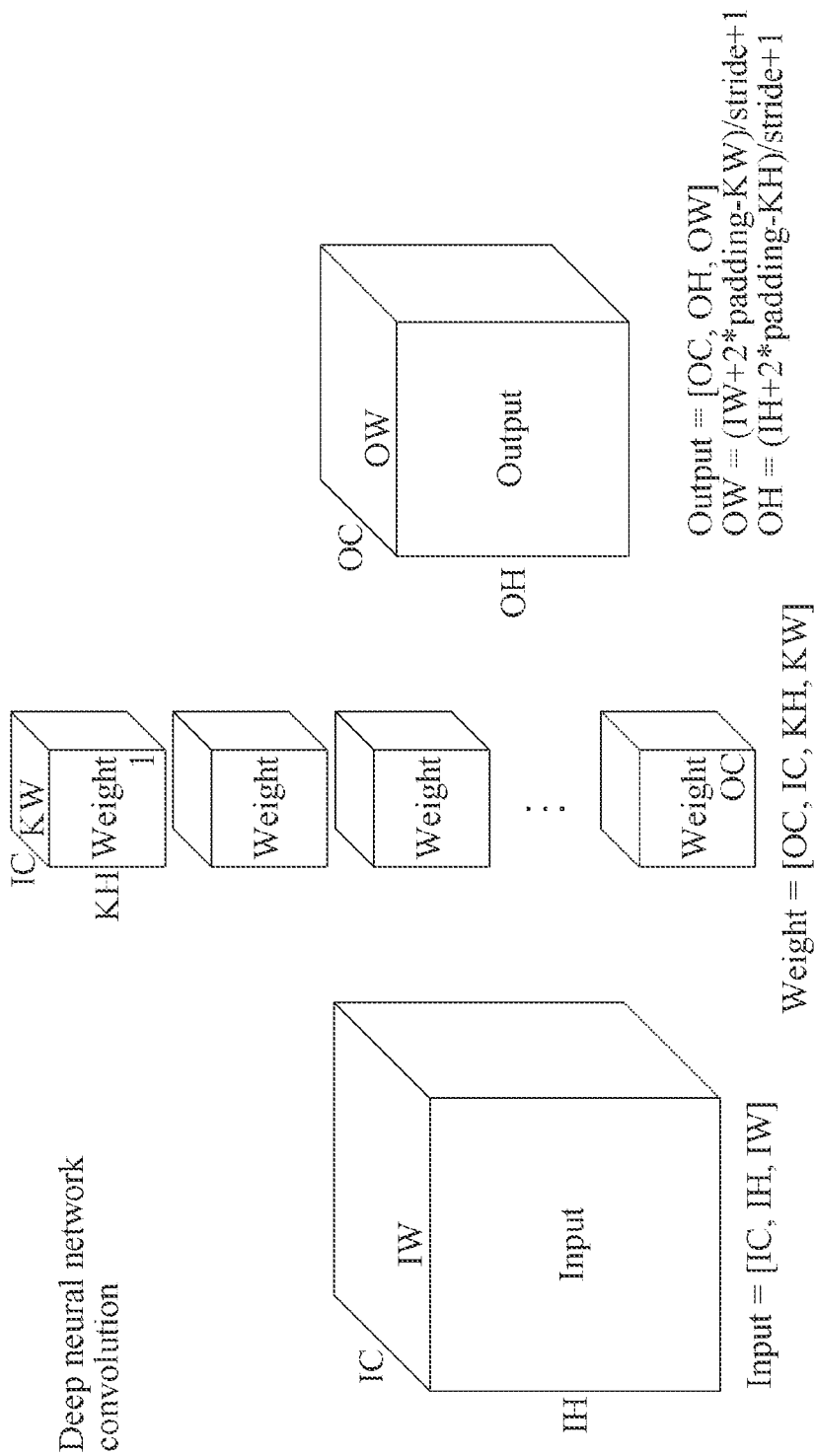
FIG. 3 illustrates an example of input data, a kernel, and output data.

FIG. 3 illustrates an example of input data, a kernel, and output data.

Referring to FIG. 3, there is a three-dimensional (3D) data set provided to explain data to be applied to a convolution operation. Input data may be represented in a form of [input channel (IC), input height (IH), input width (IW)]. A weight of a kernel may be represented in a form of [output channel (OC), IC, kernel height (KH), kernel width (KW)]. Output data may be represented in a form of [OC, output height (OH), output width (OW)].

Figure 4:
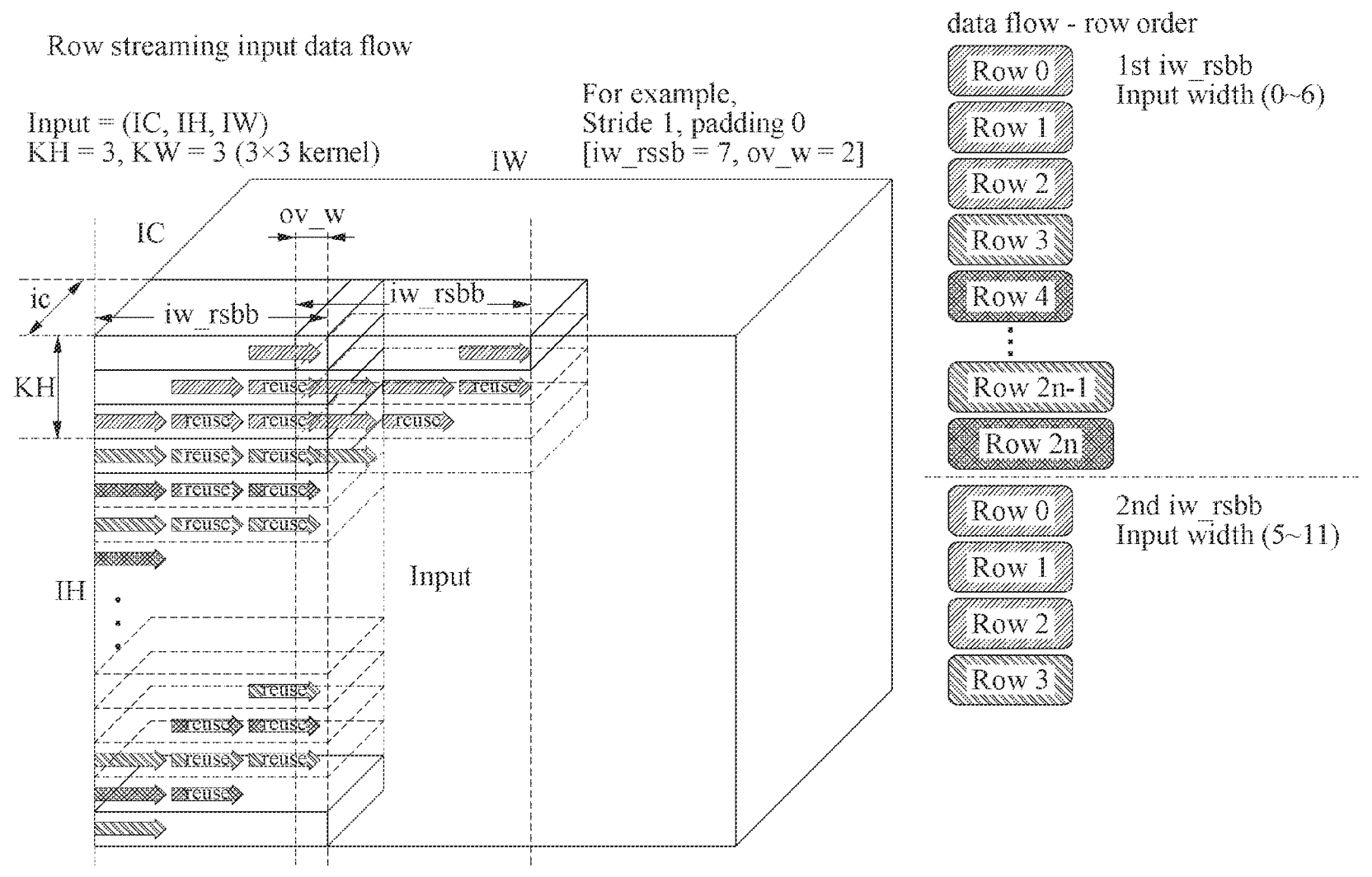

FIG. 4 illustrates an example of an input data flow in row streaming.

Referring to FIG. 4, there is a pattern of accessing input data in a row streaming data flow. In the example of FIG. 4, ic indicates a partial input channel, iw_rsbb indicates an input width max size based on a RSBB size, and ov_w indicates an overlap width based on a size of stride.

In row streaming, an input width corresponding to iw_rsbb determined by an RSBB size in a chaining buffer may be reused in the chaining buffer, and iw_rsbb may have a width corresponding to a value of RSBB size+1. iw_rsbb indicates a maximum (max) size of an input width that is processible through one-time row streaming. In a case of an actual deep neural network (DNN), an input width may differ for each layer. Thus, in a case of processing an input width greater than iw_rsbb, it may need to be processed by dividing it by iw_rsbb. Here, between iw_rsbb, an overlap width interval corresponding to ov_w may be generated. For example, in a case in which stride is 1 and padding is 0 when processing a 3×3 kernel convolution operation, an overlap corresponding to 2 may occur, and thus ov_w may be 2. In a case in which an RSSB size is 6, iw_rssb may be 7. Thus, based on an entire input matrix, input data corresponding to 7×IH×ic from input width 0 to input width 6 may be loaded in first row streaming, and input data corresponding to 7×IH×ic from input width 5 to input width 11 may be loaded in second row streaming. Through this, data may flow in a manner that an input width corresponding to iw_rsbb is processed for all rows through one-time row streaming and then processing is performed in the same way for all rows after moving to the next iw_rsbb.

Figure 5:
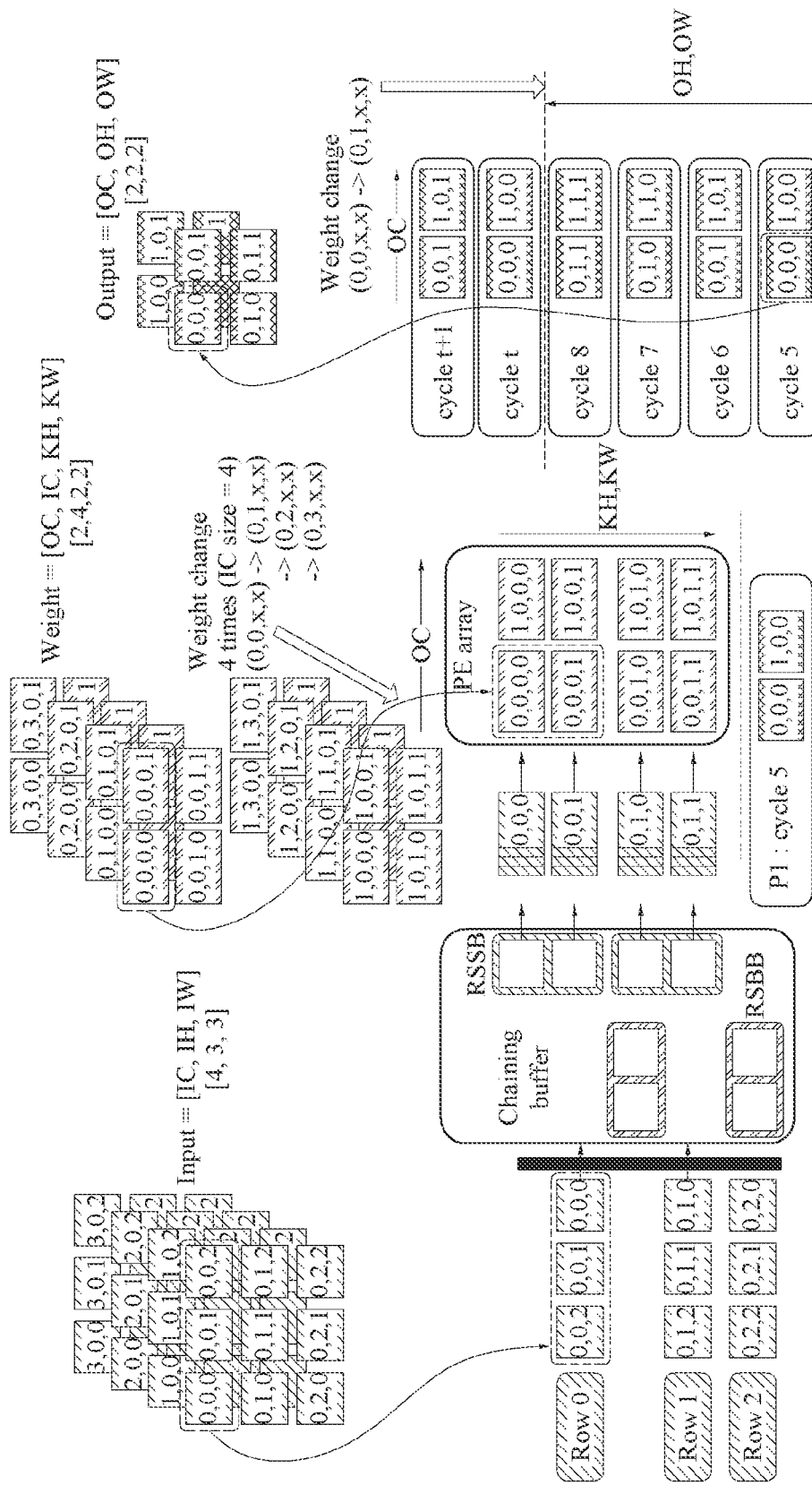
FIGS. 5 and 6 illustrate examples of an operation of a chaining buffer and a processing element (PE) array.
Figure 6:
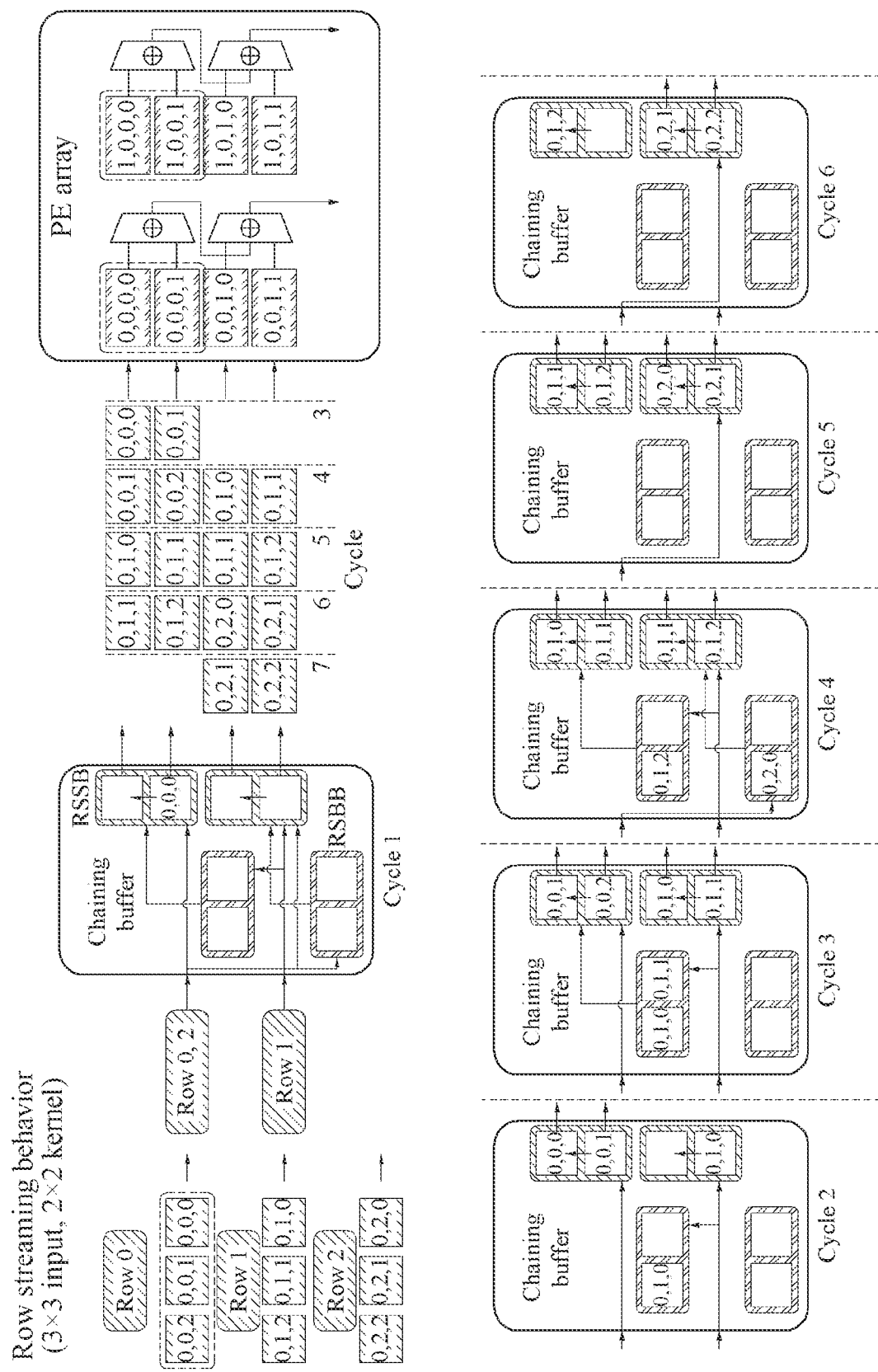

FIGS. 5 and 6 illustrate examples of an operation of a chaining buffer and a PE array.

Referring to FIG. 5, a convolution operation on input data in a form of [4, 3, 3] and a weight in a form of [2, 4, 2, 2] may be performed in a 2×4 PE array, and output data in a form of [2, 2, 2] may be obtained as a result. A data mapping form for a row streaming data flow may correspond to kernel parallelization in a form that performs an operation once for all kernels of the same channel. Through this, weights (0, 0, 0, 0), (0, 0, 0, 1), (0, 0, 1, 0), and (0, 0, 1, 1) of a same channel may each be mapped to a respective row in a first column of a PE array. In a second column of the PE array, weights (1, 0, 0, 0), (1, 0, 0, 1), (1, 0, 1, 0), and (1, 0, 1, 1) of another channel may be similarly mapped. Thus, data input to the PE array may be computed in the first column of the PE array and then transferred to the second column of the PE array, and thus the input data may be reused. In a chaining buffer of FIG. 5, RSSBs are represented in a vertically long shape and RSBBs are represented in a horizontally long shape. A non-limiting example convolution operation based on the chaining buffer and the PE array will be described in detail with reference to FIG. 6.

Referring to FIG. 6, for a convolution operation between 3×3 input data and a 2×2 kernel, a row streaming data flow-based operation of a chaining buffer and a PE array may be performed in each cycle as illustrated.

In cycle 1, only first data (0,0,0) in row 0 of input data may be transferred to the chaining buffer and stored in a lower element of a first RSSB.

In cycle 2, the data (0,0,0) stored in cycle 1 may be upshifted in the first RSSB to move to an upper element of the first RSSB, and second data (0, 0, 1) in row 0 of the input data may be stored in the lower element of the first RSSB in a same way as the first data (0,0,0) was stored in cycle 1. Thus, in cycle 2, the data (0,0,0) may be stored in the upper element of the first RSSB and the data (0, 0, 1) may be stored in the lower element of the first RSSB. Here, in cycle 2, data is stored in all the elements of the first RSSB, and thus the data (0,0,0) and the data (0, 0, 1) of the RSSB may be transferred to the PE array in cycle 3 which is a next cycle.

In a case of a second RSSB, in cycle 2, first data (0, 1, 0) in row 1 of the input data may be stored in a lower element of the second RSSB and simultaneously in a first RSBB. For a future request for the data in row 1 by the first RSSB, the RSBB may back up the data. In addition, after data (0, 1, 0), (0, 1, 1), and (0, 1, 2) in row 1 of the input data is computed with a weight (0, 0, 1, 0) and a weight (0, 0, 1, 1) of a kernel for row 1, the data may also be used for an operation with a weight (0, 0, 0, 0) and a weight (0, 0, 0, 1) of the kernel for row 0. Thus, the data (0, 1, 0), (0, 1, 1), and (0, 1, 2) in row 1 of the input data may be reused in the chaining buffer without being loaded again from a global SRAM.

In cycle 3, last data (0, 0, 2) in row 0 of the input data may be stored in the lower element of the first RSSB, and the previous data (0, 0, 1) may be upshifted to and stored in the upper element of the first RSSB. The subsequent data (0, 1, 1) in row 1 of the input data may be stored in the lower element of the second RSSB. The previous data (0, 1, 0) may be upshifted to and stored in the upper element of the second RSSB. In a same manner as in cycle 2, the data (0, 1, 1) may also be stored in the first RSBB. Thus, in cycle 3, the data (0, 0, 1) and (0, 0, 2) may be stored in the first RSSB, and the data (0, 1, 0) and (0, 1, 1) may be stored in the second RSSB. Here, in cycle 3, data is stored in all elements of each RSSB, and thus the data (0, 0, 1), (0, 0, 2), (0, 1, 0), and (0, 1, 1) stored in the two RSSBs may be transferred to the PE array in cycle 4 which is a next cycle. As described above, when all elements of an RSSB are occupied by data stored therein, the stored data may be output to the PE array in a next cycle.

When the first RSSB completes loading of the last data (0, 0, 2) in row 0 of the input data in cycle 3, data in row 1 of the input data may be needed from a next cycle. Here, the data in row 1 of the input data is already backed up in the first RSBB, and thus the operation of one or more embodiments may read the data from the first RSBB without repeatedly reading it for row 1 of the input data from the global SRAM. In such a case of a row change (cycle 4, for example), the existing data stored in the first RSSB may be all removed, and data in a new row may be changed by a width (or a kernel width) of the RSSB. Through this, a bubble (that may increase processing time) that may be generated by such a row change may not be generated in a pipeline operation. Thus, the two sets of data may be transferred from the first RSBB to the first RSSB. In addition, data in row 0 of the input data that is read at a first port of the chaining buffer may all be read, and thus data in row 2 of the input data which is a new row to be processed subsequently may be read through the first port from a next cycle. Here, loading for row 1 of the input data may still be performed in the second RSSB, and thus data in row 2 of the input data may not be stored immediately in the second RSSB. Instead, initial data in row 2 of the input data may be stored in the second RSBB.

As verified in cycle 4, the first RSSB may read the data backed up in the first RSBB, and it may thus be verified that such repeated access to the global SRAM for row 1 of the input data is not necessary and therefore not performed, thereby reducing cost. Since there is a row change occurring, the first RSSB may read data one by one from the first RSBB in a next cycle. In addition, data (0, 2, 0) in row 2 of the input data that is newly transferred from the first port of the chaining buffer may not be stored immediately in the second RSSB, and thus may instead be backed up and stored in the second RSBB. The last data (0, 1, 2) in row 1 of the input data that is being processed may be stored in the lower element of the second RSSB, and the data (0, 1, 2) may also be stored in the first RSBB in a same way as in a previous cycle. Here, the second RSSB may also complete loading the last data in row 1 of the input data, and thus a row change to row 2 of the input data may be next.

In cycle 5, the second RSSB completes processing for row 1 of the input data, and thus row 2 of the input data may be processed. Here, second data (0, 2, 1) in row 2 of the input data may be immediately stored in the lower element of the second RSSB, and the initial data (0, 2, 0) that is backed up due to the previous processing for row 1 of the input data may be read from the second RSBB and then stored in the upper element of the second RSSB. That is, the data (0, 2, 0) may be stored in the upper element of the second RSSB and the data (0, 2, 1) may be stored in the lower element of the second RSSB.

In cycle 6, when last data (0, 2, 2) in row 2 of the input data is stored in the lower element of the second RSSB, loading for the 3×3 input data for the convolution operation may all be completed. As described above, through only one-time access to the global SRAM for each input data, the operation of one or more embodiments may generate duplicated input data required by the PE array. Thus, access to the global SRAM may occur by a total number of 9 times (3×3=9), and duplicated input data that is requested by the PE array may be generated through the chaining buffer by a total number of 16 (2×2×2×2=16) and then transferred through a plurality of cycles. Thus, a total number of access to the global SRAM may be effectively reduced, thereby reducing cost. Although access to the chaining buffer may occur by a total number of 24 times to generate the duplicated input data, access energy of the chaining buffer may be considerably smaller than that of the global SRAM despite a change of a buffer size. Thus, by reusing input data through the internal chaining buffer, the operation of one or more embodiments may improve the entire energy efficiency and/or cost of the accelerator 200.

FIGS. 7 through 11 illustrate examples of an operation of a chaining buffer and a PE array.

Figure 7:
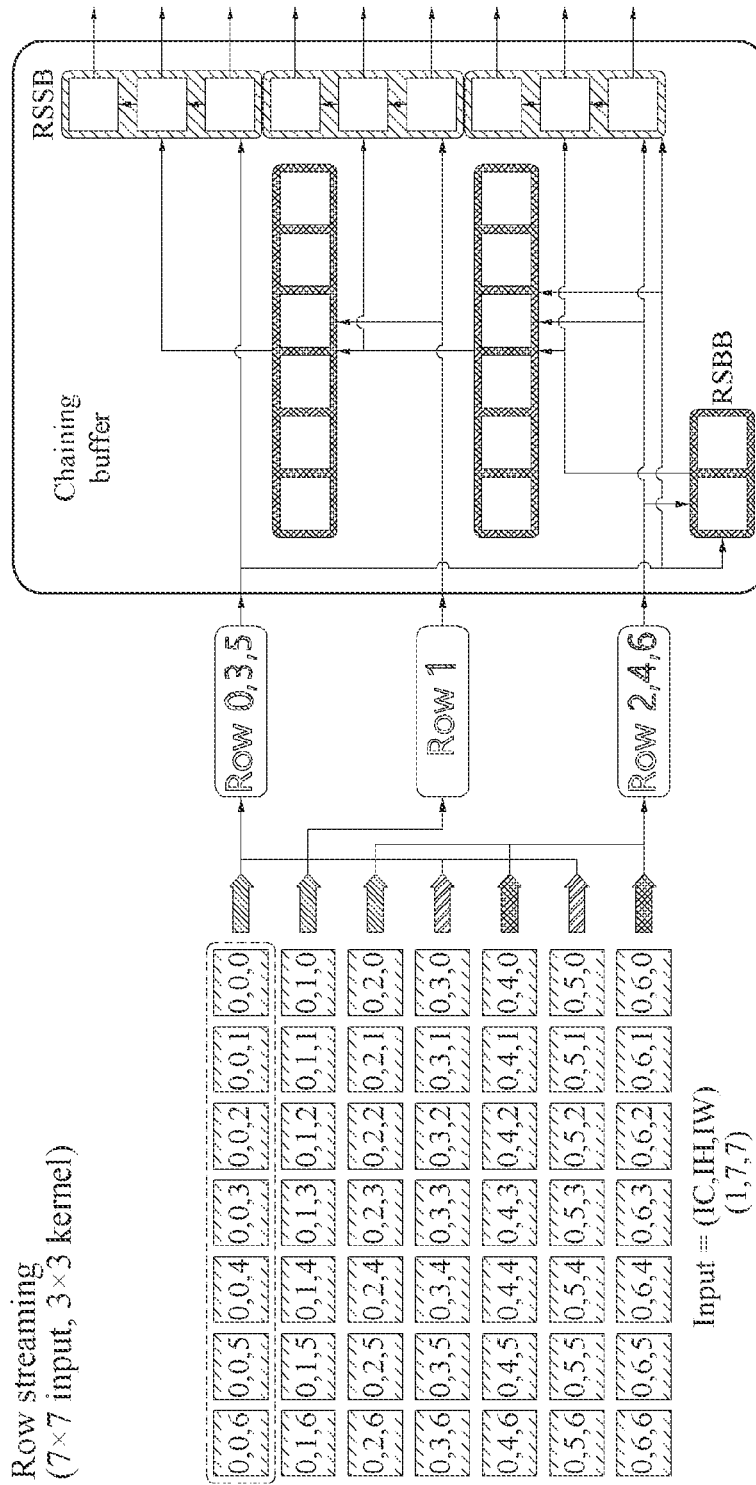
FIGS. 7 through 11 illustrate examples of an operation of a chaining buffer and a PE array.
Figure 8:
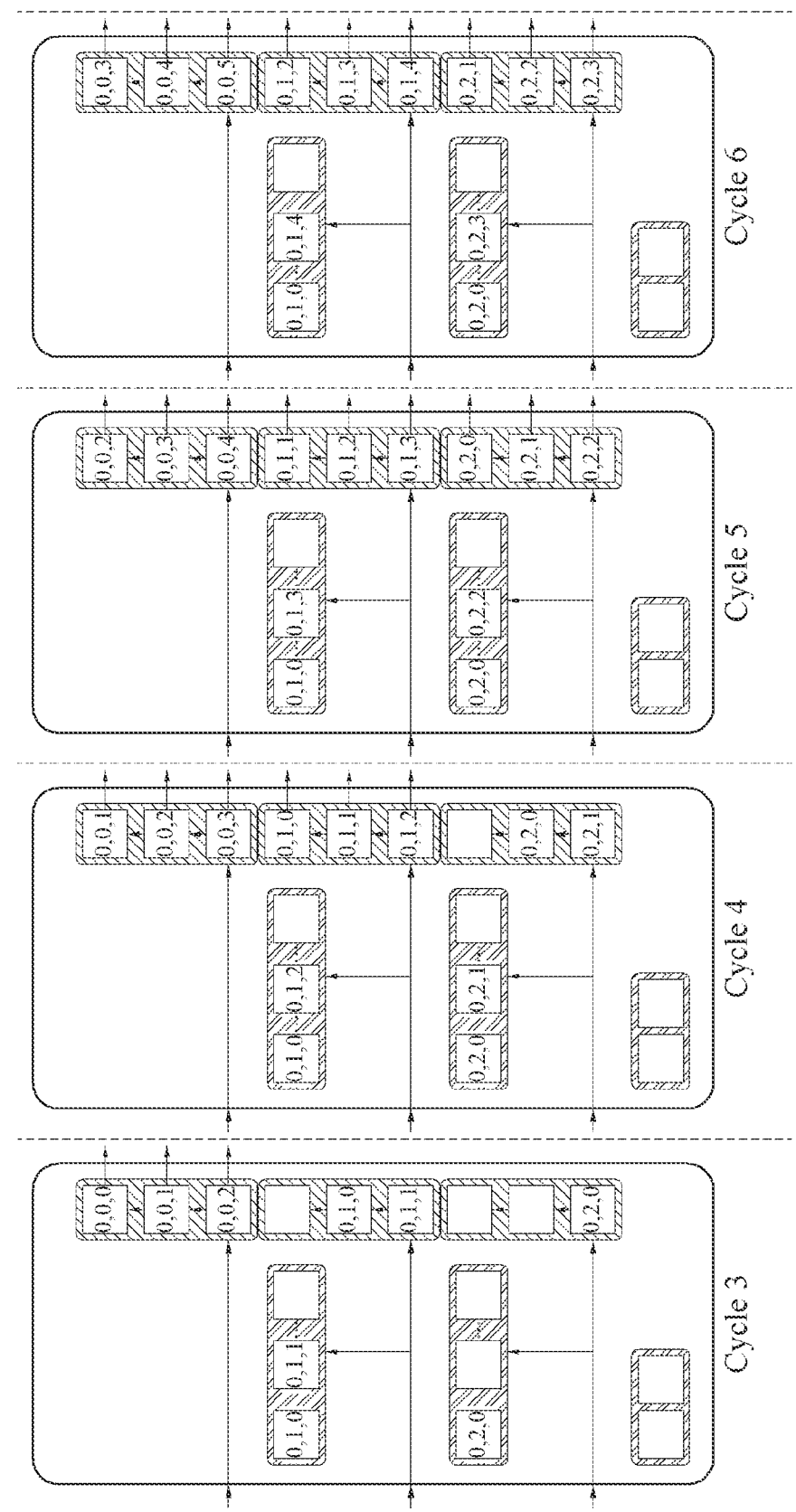
Figure 9:
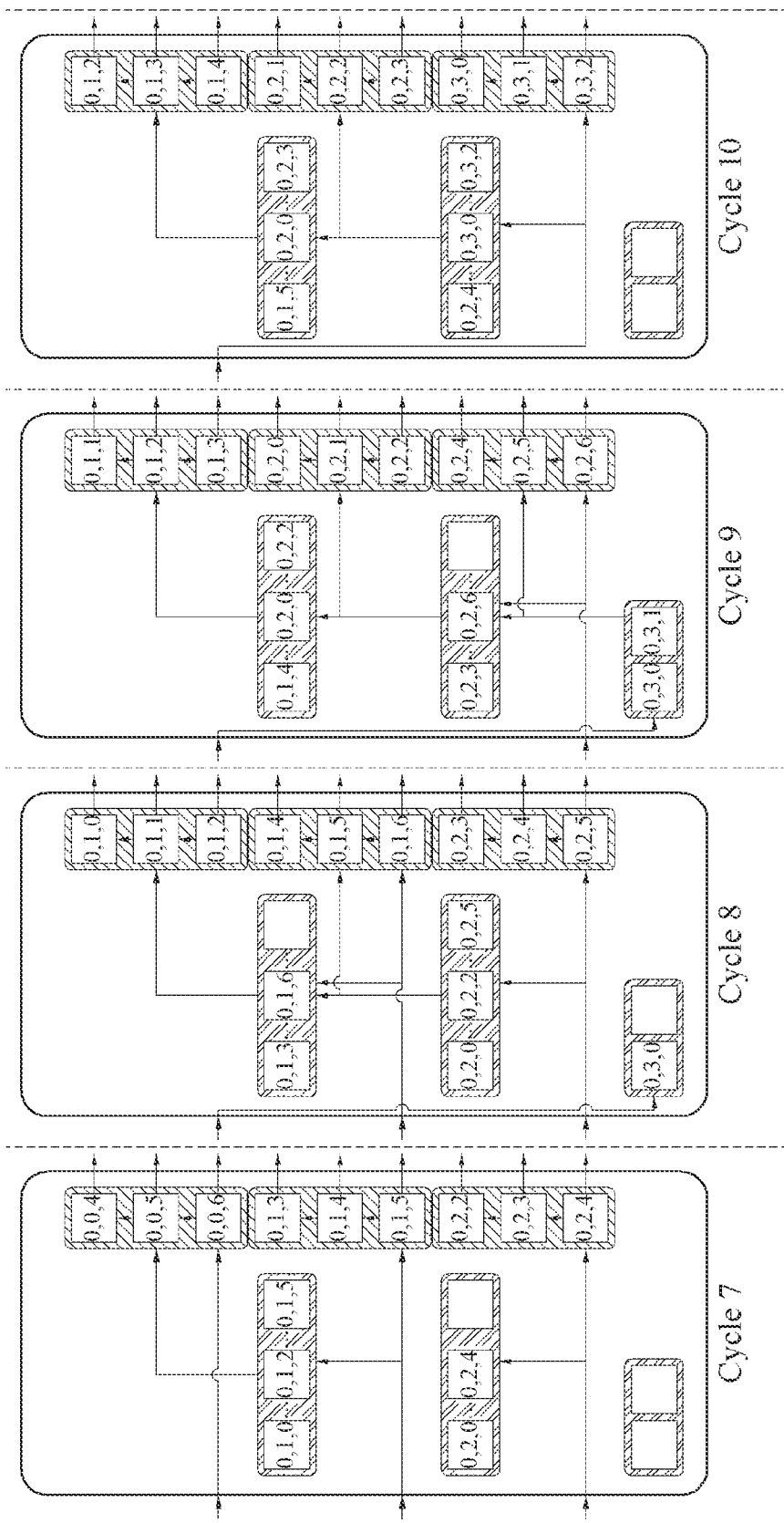
Figure 10:
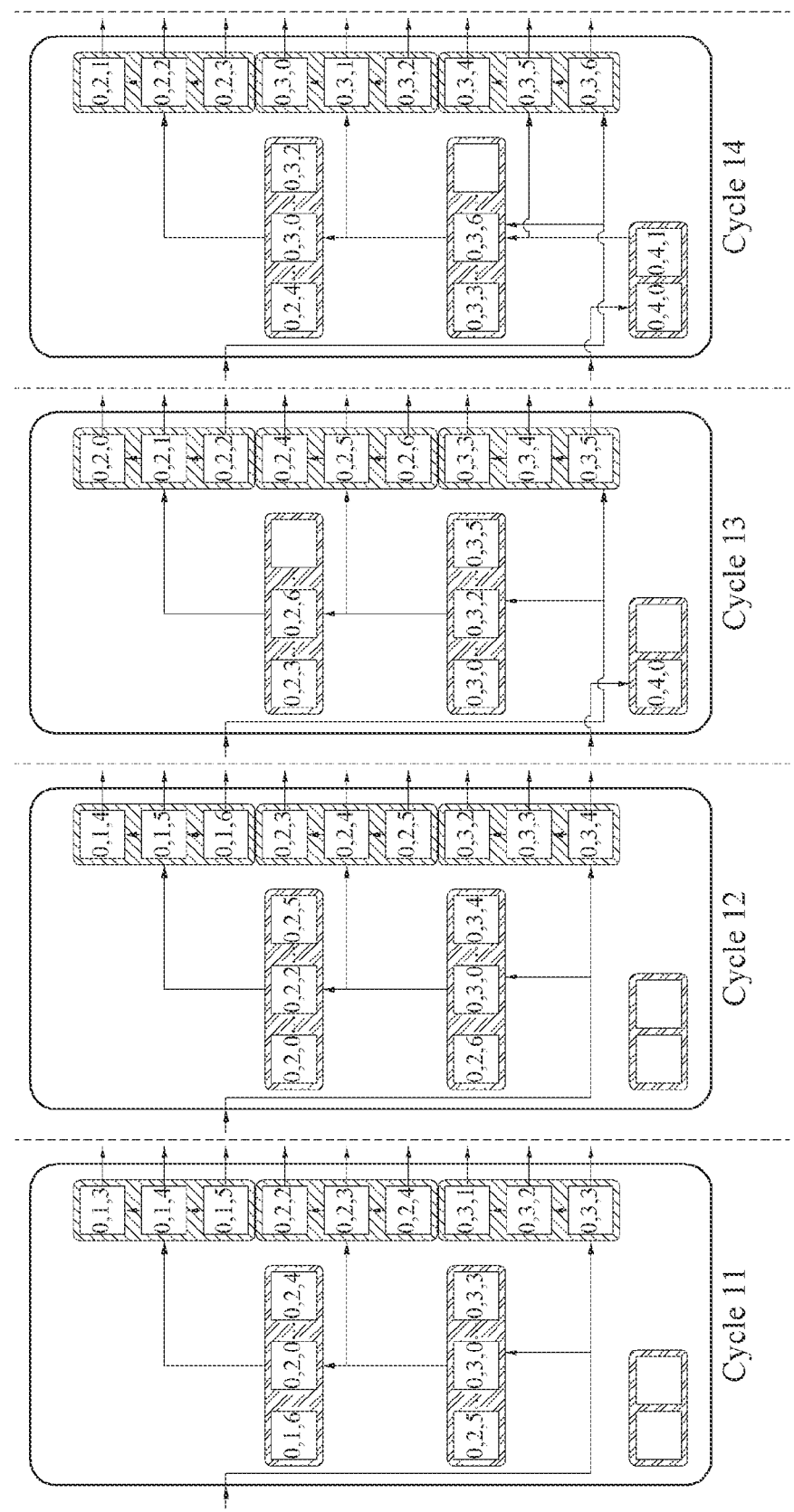
Figure 11:
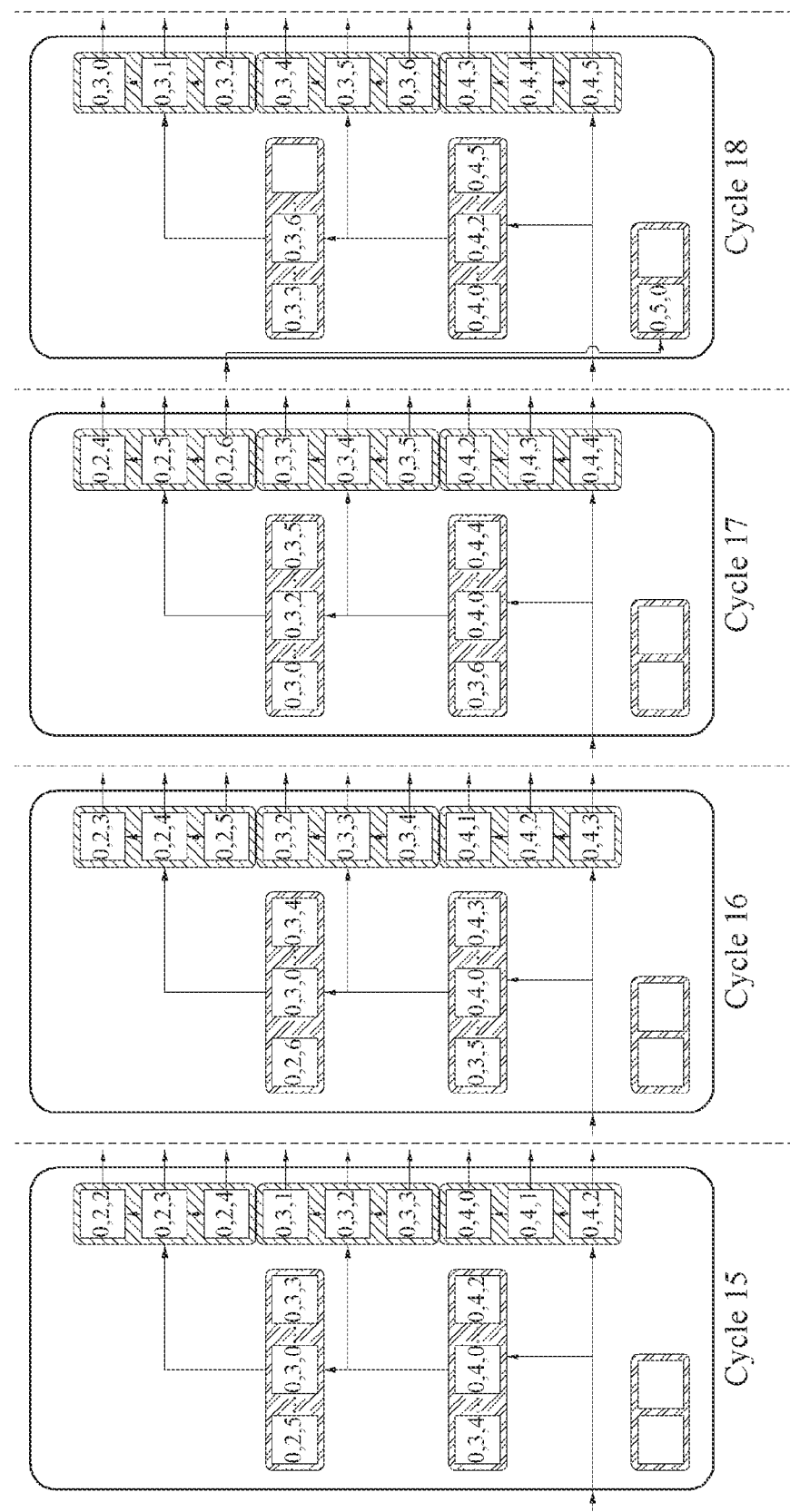

Referring to FIG. 7, there is a chaining buffer in a type of row streaming based on 7×7 input data and a 3×3 kernel.

An RSSB size is determined to be KH×KW. In the example of FIG. 7, a total of nine elements (3×3=9) may be needed. The nine elements may be grouped by three for each, and three RSSBs may be included in the chaining buffer. An RSBB size is determined to be (IW−1)×(KH−1)+(KW−1) to process input data through one-time row streaming. In the example of FIG. 7, a total of 14 elements ((7−1)×(3−1)+2=14) may be needed. Here, three RSBBs including 6, 6, and 2 may be included in the chaining buffer. As illustrated in FIG. 7, rows of each input data may be mapped to each port of the chaining buffer, and the chaining buffer may operate in the same way as described above in each cycle.

An operation in the chaining buffer may be classified into three unit operations including an operation of reading data from a global SRAM to the chaining buffer, an RSSB operation, and an RSBB operation.

Input data read from the global SRAM through each port may be stored as described in the following three cases. The read input data may be stored i) in a lower element of an RSSB, ii) in the lower element of the RSSB and an RSBB simultaneously, and iii) only in the RSBB.

The RSSB may perform an upshift operation of upshifting by the number of stride in each cycle. For example, in a case in which the stride is 1, sets of data stored in internal elements may be shifted by 1 for each cycle, and thus the RSSB may be configured in a form of a shift register. In addition, when all the elements of the RSSB store sets of data, the sets of data may be output and be transferred to a PE array in a next cycle. Such shift and output operations may be performed when the condition described above is satisfied.

The RSBB may be used only in a situation in which data reuse occurs. At a time in which a row change occurs, the RSBB may transfer data corresponding to the RSSB size to a corresponding RSSB. Alternatively, in a case in which stable data reuse occurs at a time which is not the time at which the row change occurs, the RSBB may transfer one set of data for each cycle to a lower element of the RSSB. In such a case, when there is the RSBB of an upper row, data transferred to the RSBB may also be transferred to the RSBB of the upper row. Based on such a defined operation of each unit, a convolution operation between the 7×7 input data and the 3×3 kernel may be performed based on row streaming, and detailed examples of internal operations in each cycle are illustrated in FIGS. 8 through 11. Through this, access to the global SRAM may occur only once for each set of data. In the examples of FIGS. 7 through 11, access to the global SRAM may occur by a total of 49 times (7×7=49), and it is thus possible to effectively reduce the total number of access to the global SRAM.

The accelerators, electronic devices, host processors, off-chip memories, memory controllers, accelerators, accelerators, global SRAMs, chaining buffers, PE arrays, electronic device 100, host processor 110, off-chip memory 120, memory controller 130, accelerator 140, accelerator 200, global SRAM 210, chaining buffer 220, PE array 230, and other devices, apparatuses, units, modules, and components described herein with respect to FIGS. 1-11 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An accelerator comprising:
   a memory configured to store input data;
   a plurality of shift buffers each configured to
      shift input data received sequentially from the memory in each cycle, and
      in response to input data being stored in each of internal elements of the shift buffer, output the stored input data to a processing element (PE) array;
   a plurality of backup buffers each configured to store input data received sequentially from the memory and transfer the stored input data to one of the shift buffers; and
   the PE array configured to perform an operation on input data received from one or more of the shift buffers and on a corresponding kernel,
   wherein the PE array comprises a plurality of PEs in a systolic array structure that performs a convolution operation between the input data and the kernel.

2. The accelerator of claim 1, wherein a size of each of the shift buffers corresponds to a size of the corresponding kernel.

3. The accelerator of claim 1, wherein
   data included in a first row of the input data is stored sequentially in a first shift buffer among the shift buffers, and
   data included in a second row of the input data is stored sequentially in a second shift buffer among the shift buffers and in a first backup buffer among the backup buffers.

4. The accelerator of claim 1, wherein, in response to a row change occurring as all data included in a first row of the input data is output to the PE array through a first shift buffer among the shift buffers, data stored in a first backup buffer among the backup buffers is transferred to the first shift buffer.

5. The accelerator of claim 4, wherein, in response to the row change occurring in the first shift buffer, all data stored in the first shift buffer is deleted, and data corresponding to a size of the first shift buffer is transferred from the first backup buffer to the first shift buffer.

6. The accelerator of claim 4, wherein the data transferred from the first backup buffer to the first shift buffer is deleted from the first backup buffer.

7. The accelerator of claim 4, wherein, after the row change occurs, the data stored in the first backup buffer is transferred sequentially to the first shift buffer, and the transferred data is deleted from the first backup buffer.

8. The accelerator of claim 1, wherein, in a cycle,
   all data included in a first row of the input data is transferred to the PE array through a first shift buffer among the shift buffers, not all data included in a second row of the input data is transferred to the PE array through a second shift buffer among the shift buffers, and data included in a third row of the input data is stored sequentially in a second backup buffer among the backup buffers.

9. The accelerator of claim 1, wherein an entire size of the shift buffers is determined based on a width and a height of the kernel.

10. The accelerator of claim 1, wherein an entire size of the backup buffers is determined based on a width of the input data and a width and a height of the kernel.

11. The accelerator of claim 1, wherein each of the shift buffers is configured to perform a shift operation by a number corresponding to a stride applied to the kernel in each cycle.

12. The accelerator of claim 1, wherein data transferred from a second backup buffer, which is lower than a first backup buffer among the backup buffers, to one of the shift buffers is also transferred to the first backup buffer.

13. The accelerator of claim 1, wherein the PE array comprises:

a plurality of multi-port adders corresponding to a size of the kernel and configured to accumulate results of an operation corresponding to a row unit of the kernel.

14. The accelerator of claim 13, wherein the multi-port adders comprise:

a first adder having a port of a same size as a width of the kernel; and one or more second adders having a port of a size increased by 1 from the width of the kernel.

15. The accelerator of claim 1, wherein the PE array is configured to:

pre-load weights included in the kernel into the PEs of the PE array and perform the convolution operation on input data sequentially transferred from one or more of the shift buffers and on corresponding weights.

16. The accelerator of claim 1, wherein a pattern of accessing the memory has a same form as an order defined in a row streaming of the input data.

17. An electronic device comprising:

the accelerator of claim 1, wherein the accelerator is configured to perform operations based on a model in response to an instruction set being executed; and a host processor configured to generate the instruction set.

18. An electronic device comprising:

a host processor; and an accelerator comprising:

a memory configured to store input data;

a plurality of shift buffers each configured to shift input data received sequentially from the memory in each cycle, and in response to input data being stored in each of internal elements of the shift buffer, output the stored input data to a processing element (PE) array;

a plurality of backup buffers each configured to store input data received sequentially from the memory and transfer the stored input data to one of the shift buffers; and the PE array configured to perform an operation on input data received from one or more of the shift buffers and on a corresponding kernel, wherein the input data stored in the memory is inference target data, and a result of the operation on the input data corresponds to an inference result including any one of object recognition, pattern recognition, computer vision, speech recognition, machine translation, and machine interpretation.

19. The device of claim 18, wherein the host processor is configured to generate an instruction set executable by the accelerator in response to a request for execution of a model in the accelerator, and the accelerator is configured to perform operations based on the model in response to the instruction set being executed.

20. An accelerator comprising:

a memory configured to store input data;

shift buffers including a shift buffer configured to upshift and output elements of a row of the input data sequentially received from the memory;

backup buffers including a backup buffer configured to transfer elements of a subsequent row of the input data to the shift buffer, in response to a last element of the row being output from the shift buffer;

a processing element (PE) array configured to perform operations on the data output from the shift buffers, wherein the PE array comprises a plurality of PEs in a systolic array structure that performs a convolution operation between the data output from the shift buffers and a corresponding kernel.

21. The accelerator of claim 20, wherein the shift buffers include another shift buffer configured to upshift and output the elements of the subsequent row sequentially received from the memory.

* * * * *